(12) United States Patent
Foote (10) Patent No.: US 7,990,386 B2
(45) Date of Patent: Aug. 2, 2011

(54) METHOD FOR CORRELATING ANIMATION AND VIDEO IN A COMPUTER SYSTEM

(75) Inventor: William F. Foote, Los Angeles, CA (US)

(73) Assignee: Oracle America, Inc., Redwood City, CA (US)

( * ) Notice: Subject to any disclaimer, the term of this patent is extended or adjusted under 35 U.S.C. 154(b) by 260 days.

(21) Appl. No.: 11/297,171

(22) Filed: Dec. 8, 2005

(65) Prior Publication Data

US 2006/0214934 A1    Sep. 28, 2006

Related U.S. Application Data

(60) Provisional application No. 60/664,739, filed on Mar. 24, 2005.

(51) Int. Cl.
*G06T 13/00* (2011.01)
(52) U.S. Cl. .................................................. 345/473
(58) Field of Classification Search ..................... None
See application file for complete search history.

(56) References Cited

U.S. PATENT DOCUMENTS

| | | | |
|---|---|---|---|
| 5,621,431 A | 4/1997 | Harper et al. | |
| 5,889,514 A * | 3/1999 | Boezeman et al. | 715/202 |
| 5,914,757 A * | 6/1999 | Dean et al. | 348/584 |
| 6,268,864 B1 | 7/2001 | Chen et al. | |
| 6,602,299 B1 * | 8/2003 | Basso et al. | 715/203 |
| 6,792,615 B1 * | 9/2004 | Rowe et al. | 725/37 |
| 6,856,322 B1 * | 2/2005 | Marrin et al. | 345/629 |
| 2003/0146915 A1 | 8/2003 | Brook et al. | |
| 2003/0156113 A1 | 8/2003 | Freedman et al. | |
| 2006/0146142 A1 * | 7/2006 | Arisawa et al. | 348/211.11 |
| 2006/0267988 A1 * | 11/2006 | Hussain et al. | 345/502 |

* cited by examiner

*Primary Examiner* — Said Broome
(74) *Attorney, Agent, or Firm* — Osha • Liang LLP (57) ABSTRACT

A method for correlating a video stream at a first speed and an animation sequence at a second speed that includes decoding the video stream to obtain a video frame, rendering the animation sequence to obtain an animation frame, wherein the first speed and the second speed are not equal, and correlating the animation frame with the video frame to obtain a correlated animation frame according to a frame index of the animation frame and a frame index of the video frame.

25 Claims, 5 Drawing Sheets

METHOD FOR CORRELATING ANIMATION AND VIDEO IN A COMPUTER SYSTEM

CROSS-REFERENCE TO RELATED APPLICATION

This application claims benefit under 35 U.S.C. §119(e) from U.S. Provisional Patent Application No. 60/664,739 entitled "METHOD FOR SYNCHRONIZING ANIMATION AND VIDEO IN A COMPUTER SYSTEM" filed on Mar. 24, 2005.

BACKGROUND

In environments where a video stream and an animation sequence are combined to be presented at the same time, accurately synchronizing the frames in the video stream with the frames in the animation sequence so that each individual video frame may be displayed together with a corresponding animation frame is required. In addition, video frames are usually composited with the corresponding animation frame to obtain a composite frame, which is then displayed.

Rendering an animation sequence using a computer often requires tremendous processing power. If the animation rendering task is given a high priority, it may take too much of the computer's processing power away from the other tasks that are being performed at the same time. For example, if a user inputs a command, the task that is responsible for handling user input may not be able to process the command and produce an appropriate response in a timely manner, because the computer processor is busy rendering the animation sequence. Accordingly, delays may result. On the other hand, if the animation rendering task is given a low priority, other processor-intensive tasks may use up too much of the computer's processing power such that the animation sequence cannot be rendered fast enough. The result is an impact on the smoothness of the animation. Ideally, the animation rendering task should be given a priority that is lower than the priority given to a very important or critical task, such as the handling of user input, but at the same time higher than the priority given to a standard yet processor-intensive task. The animation priority may also depend on how important the animation rendering is to the user.

When an animation sequence is rendered by a software program, the speed that the software program may render the individual frames forming the animation sequence depends on many variables, including but not limited to the speed and the number of the processors in the computer system, the size of the available memory, and the programming language used to program the software program. When the animation sequence is rendered in real time and is combined with a video stream so that each individual frame in the video stream is presented with a corresponding frame in the animation sequence, it is necessary to correlate the video frame and its corresponding animation frame accurately.

Often for performance reasons, the video stream is processed in parallel with the rendering of the animation sequence. For example, the software program may decode the video stream in one thread and render the animation sequence in another thread. Alternatively, a hardware video decoder may decode the video stream while a software program renders the animation sequence. It is often desirable that the software program is able to control the priority of the two threads. Most often, the video frames are decoded at a speed different from the speed at which the animation frames are rendered. Sometimes, delays in various parts of the computer system exist. For example, application programs may be unresponsive or experience pauses due to garbage collection (GC). One possible method for synchronizing the video frames and the animation frames is to pre-render the entire animation sequence ahead of time and store the individual animation frames in memory to be used at a later time. However, this does not address the situation where the animation sequence must be rendered in real time.

SUMMARY

In general, in one aspect, the invention relates to a system for correlating a video stream at a first speed and an animation sequence at a second speed. The system comprises a video decoder for decoding the video stream to obtain a video frame, an animation renderer for rendering the animation sequence to obtain an animation frame, wherein the first speed and the second speed are not equal, and a frame correlator for correlating the animation frame with the video frame to obtain a correlated animation frame according to a frame index of the animation frame and a frame index of the video frame.

In general, in one aspect, the invention relates to a method for correlating a video stream at a first speed and an animation sequence at a second speed. The method comprises decoding the video stream to obtain a video frame, rendering the animation sequence to obtain an animation frame, wherein the first speed and the second speed are not equal, and correlating the animation frame with the video frame to obtain a correlated animation frame according to a frame index of the animation frame and a frame index of the video frame.

In general, in one aspect, the invention relates to a computer readable medium comprising software instructions for correlating a video stream at a first speed and an animation sequence at a second speed. The computer readable medium comprising software instructions to decode the video stream to obtain a video frame, render the animation sequence to obtain an animation frame, wherein the first speed and the second speed are not equal, and correlate the animation frame with the video frame to obtain a correlated animation frame according to a frame index of the animation frame and a frame index of the video frame.

Other aspects of the invention will be apparent from the following description and the appended claims.

DETAILED DESCRIPTION

Exemplary embodiments of the invention will be described with reference to the accompanying figures. Like elements in the figures are denoted by like reference numerals for consistency.

In the exemplary embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily confusing the description.

In general, embodiments of the invention relate to an apparatus and a method for correlating a video stream at a first speed and an animation sequence at a second speed. Specifically, embodiments of the invention relate to correlating each individual frame in the animation sequence with a frame in the video stream according to the index of the frame in the animation sequence and the index of the frame in the video stream. Further, embodiments of the invention relate to decoding the video stream to obtain individual video frames, rendering the animation sequence by rendering the individual animation frames that form the animation sequence, and correlating the animation frames with the video frames and the decoding of the video stream is performed at a speed different from the rendering of the animation sequence.

Generally, the term video refers to collections of visual frames produced by a video recording device, such as a camcorder or a movie camera, often capturing live motions. In contrast, the term animation refers to collections of picture frames produced by manual drawings or generated by computers. Despite being different visual media, video and animation do have similarities. Both are collections or series of distinct still images or frames. When these frames are displayed at a sufficiently fast speed, such as 30 frames per second, the frames create an optical illusion where the frames appear to be connected to the naked eye. As a result, the eye sees continuous moving images.

In the modern multi-media environment, audio and visual data from different media formats are often combined to create more complex or sophisticated effect. For example, video and animation sometimes are combined to create the effect of animated characters interacting with live persons. This may be achieved by combining the video frames and animation frames before they are displayed. Sometimes, the animation frames can be pre-generated, or pre-rendered, before the combining operation. But sometimes, the animation frames need to be rendered at the same time as the combining operation, that is, in real time. In this case, it is necessary to have a method to correctly correlate the generated animation frames with the video frames.

Figure 1:
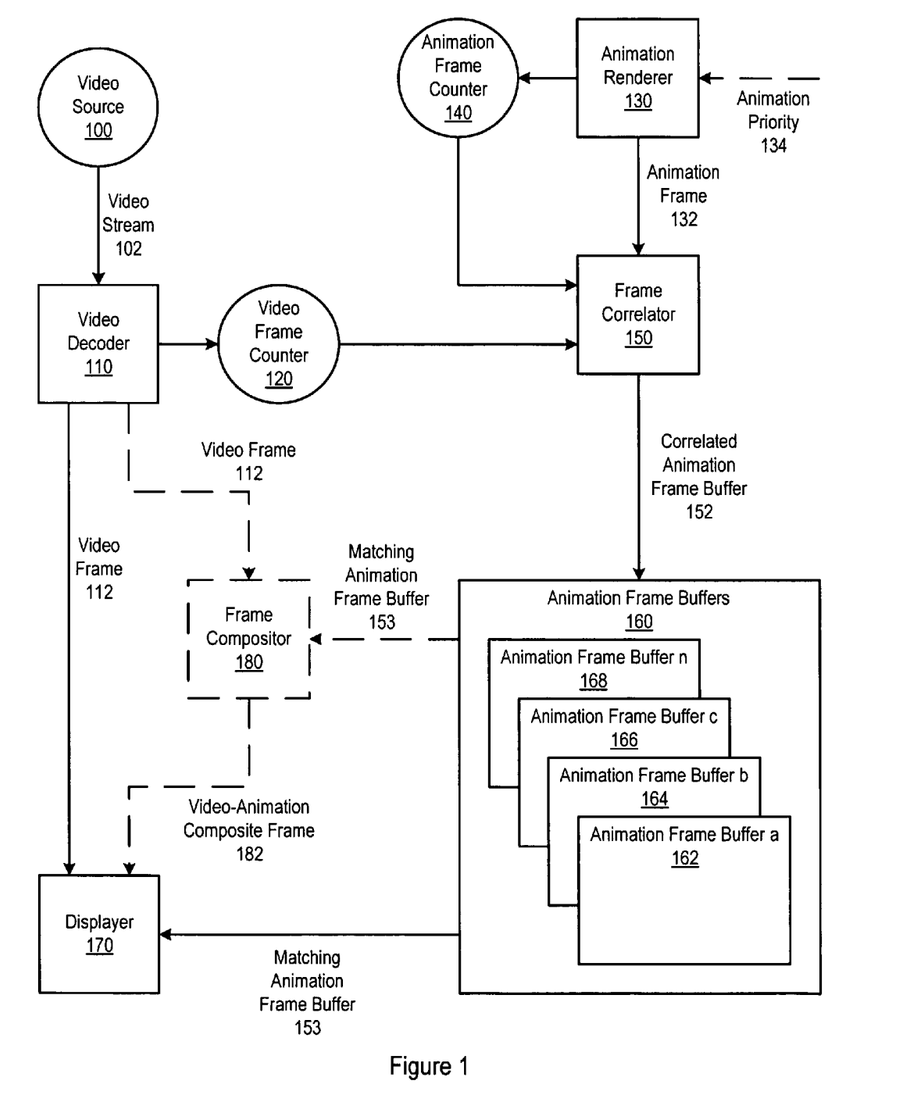
FIG. 1 shows a system for rendering an animation sequence in accordance with one or more embodiments of the invention.

FIG. 1 shows a system for rendering an animation sequence while the video and animation frames are being displayed in accordance with one or more embodiments of the invention. In one part of the system, a video source (100) feeds a video stream (102) into a video decoder (110).

The video source (100) may be a webcam, a Video Cassette Recorder (VCR) player, Digital Video Disc (DVD) player, a television, a camcorder, or any other type of video device. The video source (100) may be a source that is either internal or external to the system.

The video stream (102) contains data of the individual video frames, which are the images to be displayed. In one or more embodiments of the invention, the video stream (102) also contains audio data, typically in the form of sounds heard along with the images. The data format of the video stream (102) may be any known type of data format. Often, the data of the video frames are compressed or encoded using a particular algorithm, such as MPEG-2 standardized Moving Picture Experts Group (MPEG) or H.264 (MPEG-4 Part 10) standardized by International Telecommunication Union Telecommunication Standardization Sector (ITU-T), so that the size of the data in the video stream (102) are of manageable size.

The video decoder (110) decodes the video stream (102) using an appropriate decoding algorithm corresponding to the algorithm used to encode the video data. For example, if the data of the video frames in the video stream (102) are encoded using the MPEG-2 encoding algorithm, then the video decoder (110) should decode the video stream (102) using the MPEG-2 decoding algorithm. By decoding the video stream (102), the video decoder (110) extracts the individual video frames from the video stream (102), and outputs one single video frame (112) at a time.

In one or more embodiments of the invention, a video frame counter (120) stores the total number of video frames (112) the video decoder (110) has decoded at any given time. Different ways exist for determining the total number of decoded video frames (112) at any given time. For example, the video decoder (110) may increment the video frame counter (120) by 1 every time a new video frame (112) is decoded and extracted from the video stream (102).

Meanwhile, in another part of the system, an animation renderer (130) renders an animation sequence using an appropriate rendering algorithm. The animation sequence is formed from multiple animation frames each separately rendered by the animation renderer (130), which draws or generates a single animation frame (132) at a time. The appropriate rendering algorithm may be chosen based on the particular needs or goals of a specific implementation of the invention. Examples of rendering algorithm include ray tracing, triangular mesh, two-dimensional (2D) drawing, etc.

Although the system shown in FIG. 1 may be implemented in any manner, guaranteeing the animation renderer (130) a certain amount of the computer's processing power allows the system to achieve better performance and results. Optionally, in one or more embodiments of the invention, an animation priority (134) may be used to control the amount of computer resources allocated to the animation renderer (130). The computer resources may include processor time, memory, and etc. Further, in one or more embodiments of the invention, the software implementation of the animation renderer (130) is allowed to control its own animation priority. Alternatively, in one or more embodiments of the invention, the system automatically controls the animation priority (134) and inputs the animation priority (134) to the animation renderer (130).

The animation priority (134) may be determined based on various factors such as the number of tasks being executed, the amount of processor power each task requires, etc. The implementation of the animation priority scheme provides limited guarantees about the fairness in determining the priority level for the animation renderer (130), so that all tasks may share the computer's resources fairly. One skilled in the art will appreciate that the animation priority (134) changes from time to time and may be reset to a different priority level as the need arises.

In one or more embodiments of the invention, an animation frame counter (140) stores the total number of animation frames (132) that the animation renderer (130) has rendered at any given time. Different ways exist to determine the total number of the rendered animation frames (132) at any given time. For example, in one or more embodiments of the invention, the animation renderer (130) may increment the animation frame counter (140) by 1 every time a new animation frame (132) is rendered.

Once an animation frame (132) has been rendered, a frame correlator (150) correlates the animation frame (132) with a corresponding video frame (112) decoded and extracted from the video stream (102) according to a function. The result of this process is a correlated animation frame (152). The operations of the frame correlator (150) are described in greater detail below in FIG. 2. One skilled in the art will appreciate that the video frame (112) corresponding to the animation frame (132) is not required to be decoded and extracted from the video stream (102) at this time.

In one or more embodiments of the invention, the system maintains a set of animation frame buffers (160) for storing the animation frames (132) after being correlated with the respective video frames (112). One skilled in the art will appreciate that while the animation frames are described as being saved in an animation frame buffer, the animation frame may be saved in any type of storage medium coupled with the system. For example, the animation frame buffers (160) may be a portion of computer memory space.

The total number of the animation frame buffers (160) included in the system may vary depending on various factors, such as the speed of the computer processor(s), the size of the memory available, etc. As shown in FIG. 1, the animation frame buffers (160) includes animation frame buffer a (162), animation frame buffer b (164), animation frame buffer c (166), and animation frame buffer n (168). In one or more embodiments of the invention, each animation frame buffer (e.g., animation frame buffer a (162), animation frame buffer b (164), animation frame buffer c (166), and animation frame buffer n (168)) stores one correlated animation frame (152). In one or more embodiments of the invention, the animation frame buffer (e.g., animation frame buffer a (162), animation frame buffer b (164), animation frame buffer c (166), and animation frame buffer n (168)) also stores the information necessary to indicate which video frame (112) corresponds to the correlated animation frame (152).

One skilled in the art will appreciate that once a particular correlated animation frame (152) is no longer needed, the correlated animation frame (152) may be discarded, and the animation frame buffer (e.g., animation frame buffer a (162), animation frame buffer b (164), animation frame buffer c (166), and animation frame buffer n (168)) used to store that correlated animation frame (152) may be reused to store another animation frame (not shown).

In one or more embodiments of the invention, each video frame (112) extracted from the video stream (102) is forwarded to a displayer (170). The displayer (170) searches through the pool of animation frame buffers (160) to find the animation frame buffer (e.g., animation frame buffer a (162), animation frame buffer b (164), animation frame buffer c (166), and animation frame buffer n (168)) containing the correlated animation frame (152) corresponding to the video frame (112). If a correlated animation frame (152) that corresponds to the video frame (112) is found, the displayer (170) retrieves the matching animation frame buffer (153) from the animation frame buffers (160) containing the corresponding correlated animation frame (152). Accordingly, the video frame (112) and its corresponding correlated animation frame (152) (from the matching animation frame buffer (153)) are displayed within the displayer (170) simultaneously.

In one or more embodiments of the invention, each video frame (112) extracted from the video stream (102) is forwarded to a frame compositor (180). The frame compositor (180) searches through the animation frame buffers (160) to find the matching animation frame buffer (153) from the animation frame buffers (160) containing the correlated animation frame (152) corresponding to the video frame (112). If a correlated animation frame (152) corresponding to the video frame (112) is found, the frame compositor (180) retrieves the matching animation frame buffer (153) from the pool of animation frame buffers (160). The video frame (112) (initially running at one speed) and its corresponding correlated animation frame (152) (initially running at a different speed) are composited together according to a specific algorithm to obtain a video-animation composite frame (182). For example, the algorithm used may take the correlated animation frame (152) and superimpose it on the video frame (112). The resulting video-animation composite frame (182) is then displayed on the displayer (170).

One skilled in the art will appreciate that the retrieval of the matching animation frame buffer (153) by the frame compositor (180) and/or the displayer (170) is merely retrieving information about the location of the buffer in memory and (while possible) does not actually require physically removing the matching animation frame buffer (153) from the pool of animation frame buffers (160). Additionally, one skilled in the art will appreciate that the video frame (112) and its corresponding correlated animation frame (152) or the video-animation composite frame (182) may be sent to another location and displayed on a different device.

Figure 2:
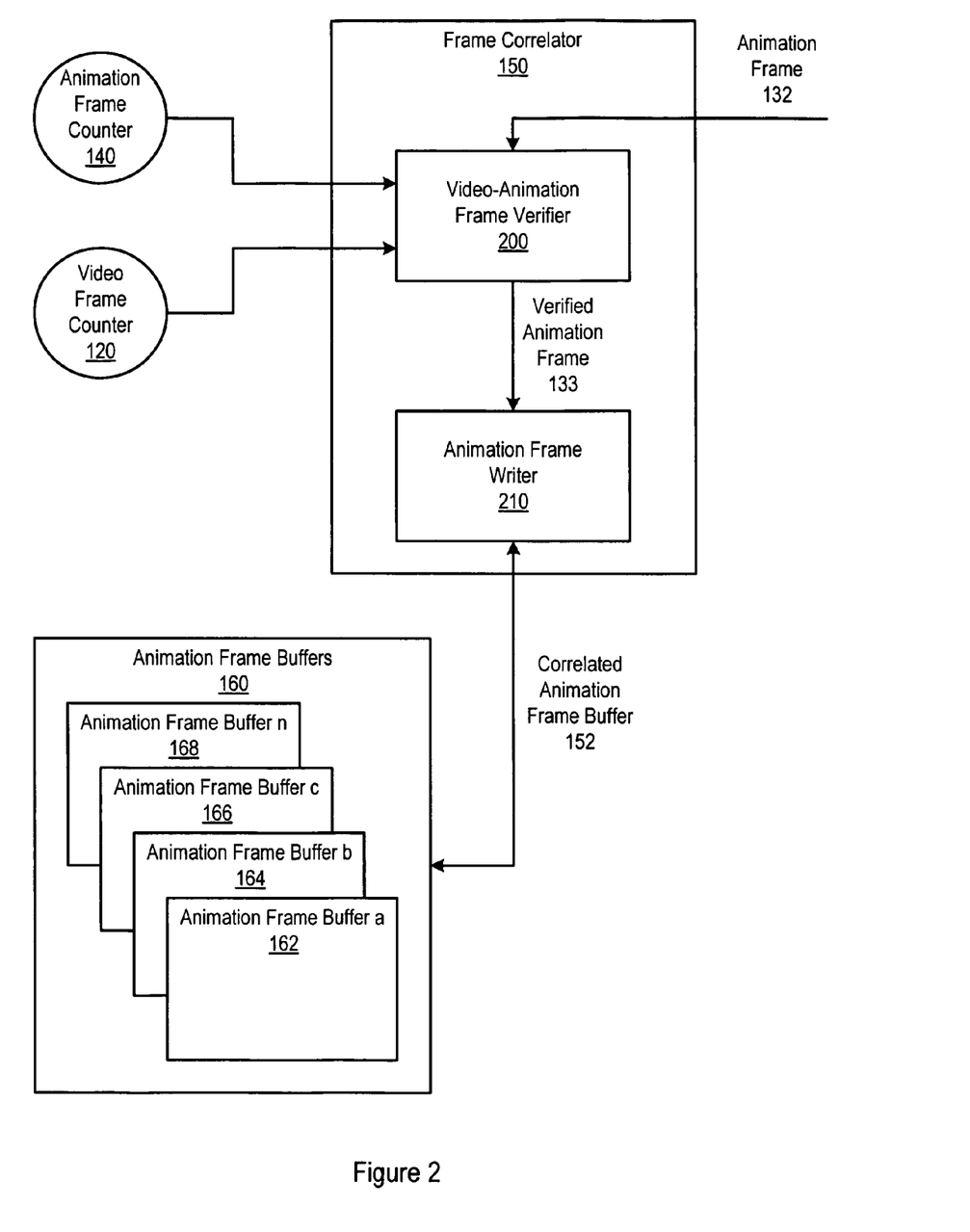
FIG. 2 shows a system with a frame correlator in accordance with one or more embodiments of the invention.

FIG. 2 shows one or more embodiments of the frame correlator (150). Once an animation frame (132) is rendered, it is forwarded to a video-animation frame verifier (200), which is a part of the frame correlator (150). The video-animation frame verifier (200) determines and verifies the video frame that corresponds to the animation frame (132). In one or more embodiments of the invention, the animation frame (132) is correlated with a video frame according to a function $i_v = f(i_a)$, where $i_a$ is an integer representing the frame index of the animation frame (132), $i_v$ is an integer representing the frame index of the video frame, and $f$ represents the function. The function may also be defined equivalently in the format $i_a = f^{-1}(i_v)$, where $f^{-1}$ represents the inverse function of $f$. For example, if the video frames and the animation frames begin correlating on the same frame index and are correlated on a one-to-one basis, then $i_v = i_a$. If the video frames lead the animation frames by 10 frames and are correlated on a one-to-one basis, then $i_v = i_a + 10$. If the video frames and the animation frames begin correlating on frame 1, and each animation frame corresponds to two consecutive video frames, then $i_a = \text{ceiling}(i_v/2)$.

Once the animation frame (132) is correlated with a video frame using their respective frame indices, the video-animation frame verifier (200) verifies if the system still needs the animation frame (132). In one or more embodiments of the invention, the corresponding video frame and animation frame (132) are displayed together immediately after the video frame has been decoded and extracted from the video stream.

The animation frame (132) is only needed if the corresponding video frame has yet to be displayed when the video-animation frame verifier (200) performs the verification. In one or more embodiments of the invention, within the video-animation frame verifier (200), the index of the video frame that correlates to the animation frame (132), $i_v$, is first determined using the function $i_v = f(i_a)$, where $i_a$ represents the frame index of the animation frame (132). In one or more embodiments of the invention, the video-animation frame verifier (200) obtains the value of $i_a$ from the animation frame counter (140). In fact, because the animation frame counter (140) is the total number of animation frames that have been rendered by the animation renderer up to this point, $i_a$ equals the animation frame counter (140).

Next, the video-animation frame verifier (200) compares $i_v$ against the video frame counter (120). If $i_v$ is smaller than or equal to the video frame counter (120), then the video frame that correlates to the animation frame (132) has already been decoded and exacted from the video stream. Usually, this means the animation renderer is too slow and has lagged behind the video decoder. In this case, the animation frame (132) is no longer needed, and thus it is not necessary to store this animation frame (132) in one of the animation frame buffers (160). On the other hand, if $i_v$ is greater than the video frame counter (120), then the corresponding video frame has not yet been decoded and thus has not been displayed. In this case, the animation frame (132) should be stored so that it may be paired up with its corresponding video frame in the future.

In one or more embodiments of the invention, the verified animation frame (133) that needs to be stored in one of the set of animation frame buffers (160) is forwarded to an animation frame writer (210). The animation frame writer (210) retrieves an available animation frame buffer (e.g., animation frame buffer a (162), animation frame buffer b (164), animation frame buffer c (166), and animation frame buffer n (168)) from the pool of animation frame buffers (160) to store the verified animation frame (133) that has been correlated with a video frame. If no animation frame buffer from the pool of animation frame buffers (160) is presently available, the animation frame writer (210) waits until an animation frame buffer from the pool of animation frame buffers (160) becomes available. The animation frame writer (210) stores the correlated, verified animation frame (133) in the available animation frame buffer from the pool of animation frame buffers (160). In one or more embodiments of the invention, the animation frame writer (210) stores the frame index for the animation frame, $i_a$, and/or the frame index for the corresponding video frame, $i_v$, in the available animation frame buffer.

One skilled in the art will appreciate that the retrieval of the available animation frame buffer (153) is merely retrieving information about the location of the buffer in memory and (while possible) does not actually require physically removing the available animation frame buffer (153) from the pool of animation frame buffers (160).

In one or more embodiments of the invention, to avoid error in accessing data stored in the animation frame buffers (160), the animation frame writer (210) prevents all other parts of the system from accessing the available animation frame buffer when writing to it. After all the data have been stored in the available animation frame buffer, the animation frame writer (210) releases the available animation frame buffer (that now contains the correlated animation frame (152)) back to the pool of animation frame buffers (160) to be accessed by other parts of the system.

Figure 3:
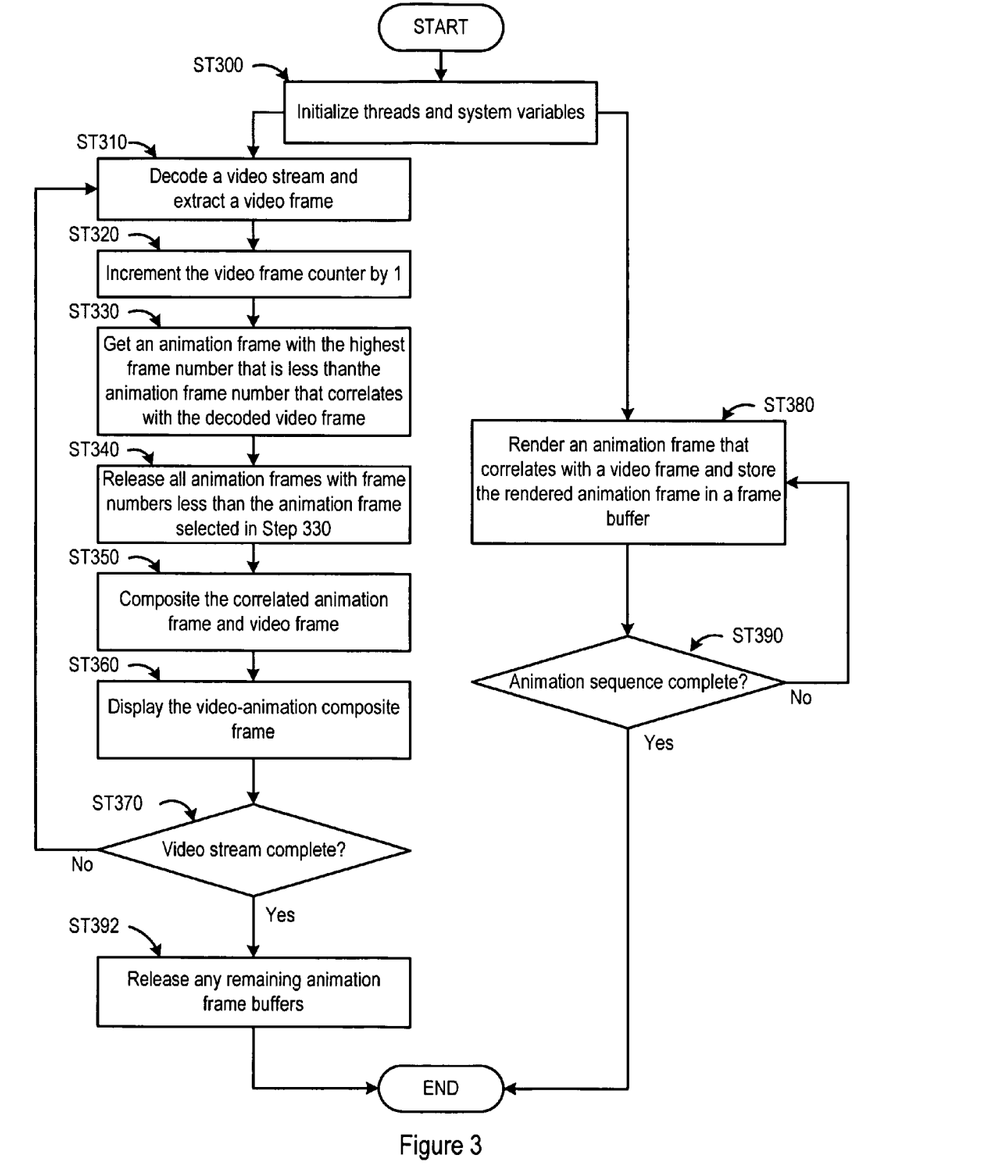
FIGS. 3-4 show flowcharts in accordance with one or more embodiments of the invention.

FIG. 3 shows a flowchart of a method in accordance with one or more embodiments of the invention. In one or more embodiments of the invention, the system is implemented by a multi-threading software program. Initially, several threads and the system variables are initialized (ST300). The number of threads created generally depends on the needs of the particular implementation. The number and type of system variables initialized also depend on the needs of the particular implementation. One skilled in the art will appreciate that the system variables may include but are not limited to a pool of the animation frame buffers used to store the correlated animation frames, a video frame counter, and an animation frame counter.

While executing a first thread of the software implementation in accordance with one or more embodiments of the invention, a video stream is decoded to extract a single video frame (ST310). As described above, the video decoding algorithm used depends on how the video stream is encoded.

In one or more embodiments of the invention, a video frame counter is incremented by 1 (ST320) to reflect the total number of video frames that have been decoded and extracted from the video stream at a given time. In one or more embodiments of the invention, the video frame counter is a system variable, which may be accessed by multiple threads. One skilled in the art will appreciate that in a multi-threading program environment, when multiple threads share the same resource, such as a system variable, for synchronization purpose, only one thread can update the resource at a time. While one thread is updating the resource, the resource needs to be "locked" to prevent all other threads from accessing it. In one or more embodiments of the invention, a mutual exclusion object (mutex) is used to achieve this purpose. Therefore, when the first thread needs to increment the video frame counter by 1 (ST320), the thread first needs to acquire and place a mutex lock on the video frame counter, increments the video frame counter by 1, and then releases the mutex lock on the video frame counter so that other threads may access the video frame counter thereafter.

In one or more embodiments of the invention, an animation frame buffer, which contains the animation frame that correlates to the video frame just decoded, is located and retrieved from the pool of the animation frame buffers. The retrieval is performed by getting an animation frame with the highest frame number that is less than or equal to the animation frame number that correlates with the decoded video frame (ST330). As stated above, one skilled in the art will appreciate that the retrieval of an animation frame buffer is merely retrieving information about the location of the animation frame buffer in memory and (while possible) does not actually require physically removing the animation frame buffer from the pool of animation frame buffers. Conceptually, to "retrieve" an animation frame buffer means to read or to access the data stored in memory where the animation frame buffer is located.

The function $i_v=f(i_a)$, or its equivalent $i_a=f^{-1}(i_v)$, defines the relationship between the video frame and the animation frame in terms of their respective frame indices. In one or more embodiments of the invention, to locate the animation frame buffer that correlates to the video frame just decoded, the index of the animation frame is first calculated using the index of the video frame and the above function. Note that this calculated index, $i_a$, is in fact the index for the animation frame that correlates to the decoded video frame.

Next, the pool of animation frame buffers is searched to locate the animation frame buffer where the animation frame whose index number equals the calculated index of the animation frame, $i_a$. In one or more embodiments of the invention, if there is no animation frame buffer that contains an animation frame whose index equals the calculated index of the animation frame, $i_a$, then the animation frame that has the highest index number less than the calculated index is used.

In one or more embodiments of the invention, all animation frames that have indices less than the index of the animation frame just located are no longer needed, because the decoding of the video stream (ST310) has moved beyond those video frames that these animation frames correlate to. Therefore, these animation frames that have indices less than the index of the animation frame just located may be discarded, and those animation frame buffers used store these animation frames may be marked "available" so that they may be used to store other animation frames in the future.

In one or more embodiments of the invention, animation frame buffers are shared among multiple threads. Thus, when one thread is accessing an animation frame buffer, that animation frame buffer needs to be reserved. Once the animation frame buffer that contains the animation frame that correlates to the decoded video frame is located, it is reserved using a condition variable. One skilled in the art will appreciate that there are different ways to implement a condition variable. In one or more embodiments of the invention, the condition variable may be implemented using a mutex lock.

In one or more embodiments of the invention, all animation frames with frame numbers less than the animation frame selected in Step 330 are released (ST340).

In one or more embodiments of the invention, the animation frame is then stored in the located animation frame buffer is accessed, and the correlated video frame and animation frame are composited together (ST350). The resulting video-animation composite frame is displayed (ST360). One skilled in the art will appreciate many different ways exist for displaying an animation frame and a video frame.

In one or more embodiments of the invention, once the display is complete, the animation frame buffer is no longer needed, and thus is released to the pool of available frame buffers. In one or more embodiments of the invention, this is controlled using the same condition variable mentioned in the previous paragraphs. Thereafter, other threads may access the animation frame buffer.

The thread repeats the process in a loop until the occurrence of a particular control event. In one or more embodiments of the invention, the thread determines whether there are any more video frames to be decoded and extracted from the video stream (ST370). If there are more video frames to be decoded and extracted, the thread returns to the beginning of the loop to continue decoding the video stream (ST310) and repeat the whole process again. If there are no more video frames to be decoded and extracted from the video stream, the loop stops and the thread ends. In one or more embodiments of the invention, an interrupting signal stops the loop and ends the thread.

Concurrently, in another thread of the software implementation, an animation frame is rendered and stored in an animation frame buffer (ST380). This step is described in more detail in FIG. 4.

The second thread repeats the process in a loop until the occurrence of a particular control event. In one or more embodiments of the invention, the thread determines whether there are any more animation frames to be rendered (ST390). If there are more animation frames to be rendered, the thread returns to the beginning of the loop to continue rendering another animation frame (ST380) and repeats the whole process again. If there are no more animation frames to be rendered, the loop stops and the thread ends. In one or more embodiments of the invention, an interrupting signal stops the loop and ends the thread. In one or more embodiments of the invention, the loop stops and the thread ends when all the video frames in the video stream have been extracted (ST310) and displayed (ST360).

Figure 4:
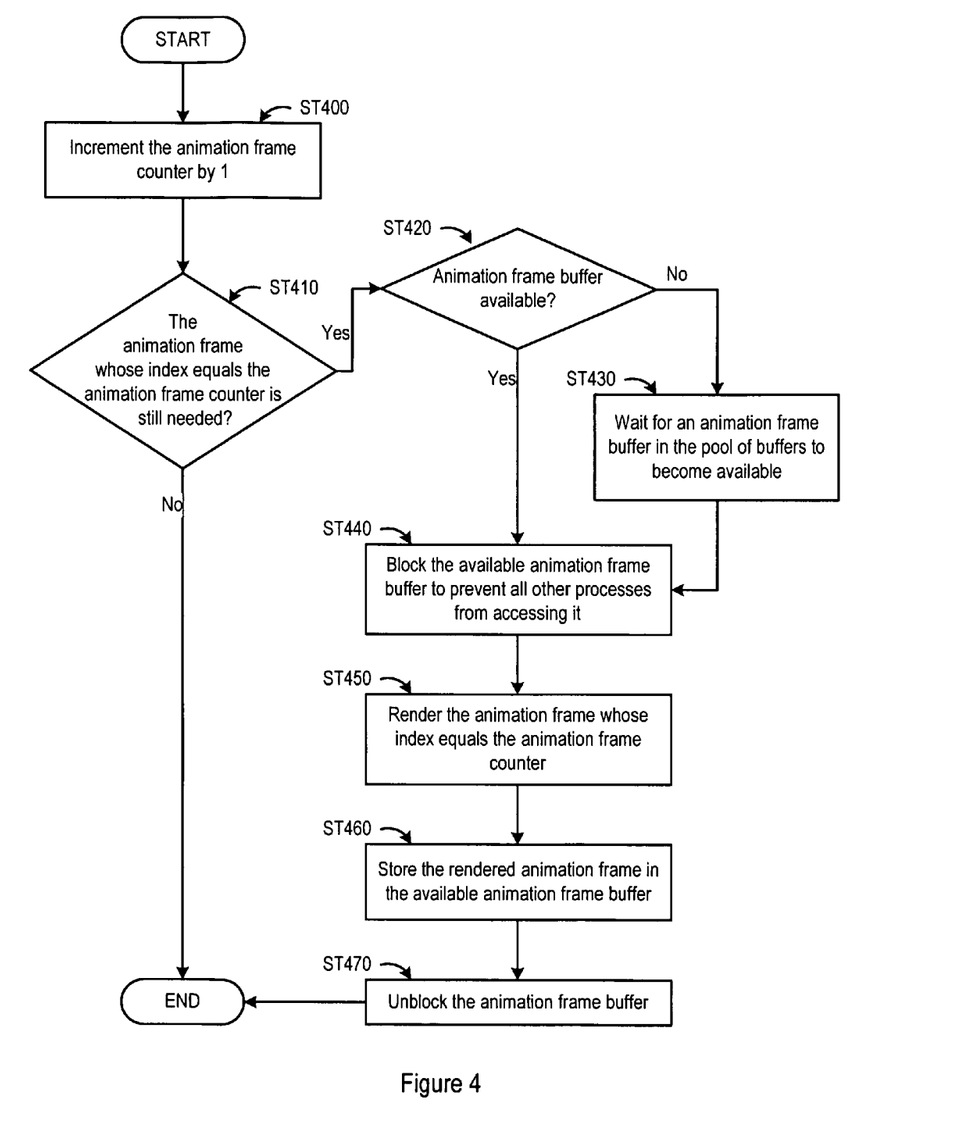

FIG. 4 shows a flowchart of a method in accordance with one or more embodiments of the invention. In one or more embodiments of the invention, an animation frame counter is incremented by 1 (ST400) to reflect the total number of animation frames that have been rendered at a given time. In one or more embodiments of the invention, the animation frame counter is a system variable shared among multiple threads. Therefore, a mutex lock needs to be placed on the animation frame counter before its value may be incremented, and the mutex lock should be released after the animation frame counter is updated.

In one or more embodiments of the invention, next, the thread tests whether the animation frame whose index equals the animation frame counter is still needed (ST410).

In one or more embodiments of the invention, the index of the video frame that correlates to the current animation frame (i.e. the animation frame whose index equals the animation frame counter) is calculated based on the function $i_v = f(i_a)$.

The thread determines whether the video frame that has the calculated index, $i_v$, has been displayed already. If so, then the current animation frame, which is in fact the animation frame correlates to the already displayed video frame, is no longer needed. In this case, there is no need to render the animation frame anymore, and thus, the thread continues to the next animation frame (ST390 of FIG. 3).

If the video frame that has the calculated index, $i_v$, has not yet been displayed, then the current animation frame needs to be rendered and stored in an animation frame buffer so that it may be displayed with its correlating video frame sometime in the future. In one or more embodiments of the invention, the thread searches through the pool of animation frame buffers and checks to see if an animation frame buffer is available to store a newly rendered animation frame (ST420). If no animation frame buffer is currently available, the thread waits until an animation frame buffer becomes available (ST430). One skilled in the art will appreciate that there are different ways for a thread to wait. For example, the thread can wait on a condition variable. When it is notified by another thread, it rechecks for an available animation frame buffer. If an animation frame buffer becomes available, the thread continues to the next step. If no animation frame buffer is available, the thread goes back to sleep and repeats the process until an animation frame buffer becomes available.

In one or more embodiments of the invention, once an animation frame buffer becomes available, the thread reserves the available animation frame buffer to prevent all other threads from accessing the animation frame buffer (ST440). As described above, one skilled in the art will appreciate that there are different ways to implement such a reservation scheme, such as a condition variable that is implemented using a mutex.

The current animation frame whose index equals the current value of the animation frame counter is rendered and stored in the available animation frame buffer (ST450). In one or more embodiments of the invention, the index of the animation frame is also stored in the animation frame buffer along with the rendered animation frame. The animation frame buffer is marked "unavailable" so that the data stored in it will not be accidentally overwritten.

In one or more embodiments of the invention, once all the necessary data are stored in the animation frame buffer, the animation frame buffer is unlocked so that other threads may access it (ST470). The thread continues to the next animation frame (ST390 of FIG. 3) to repeat the process until the thread ends.

Figure 5:
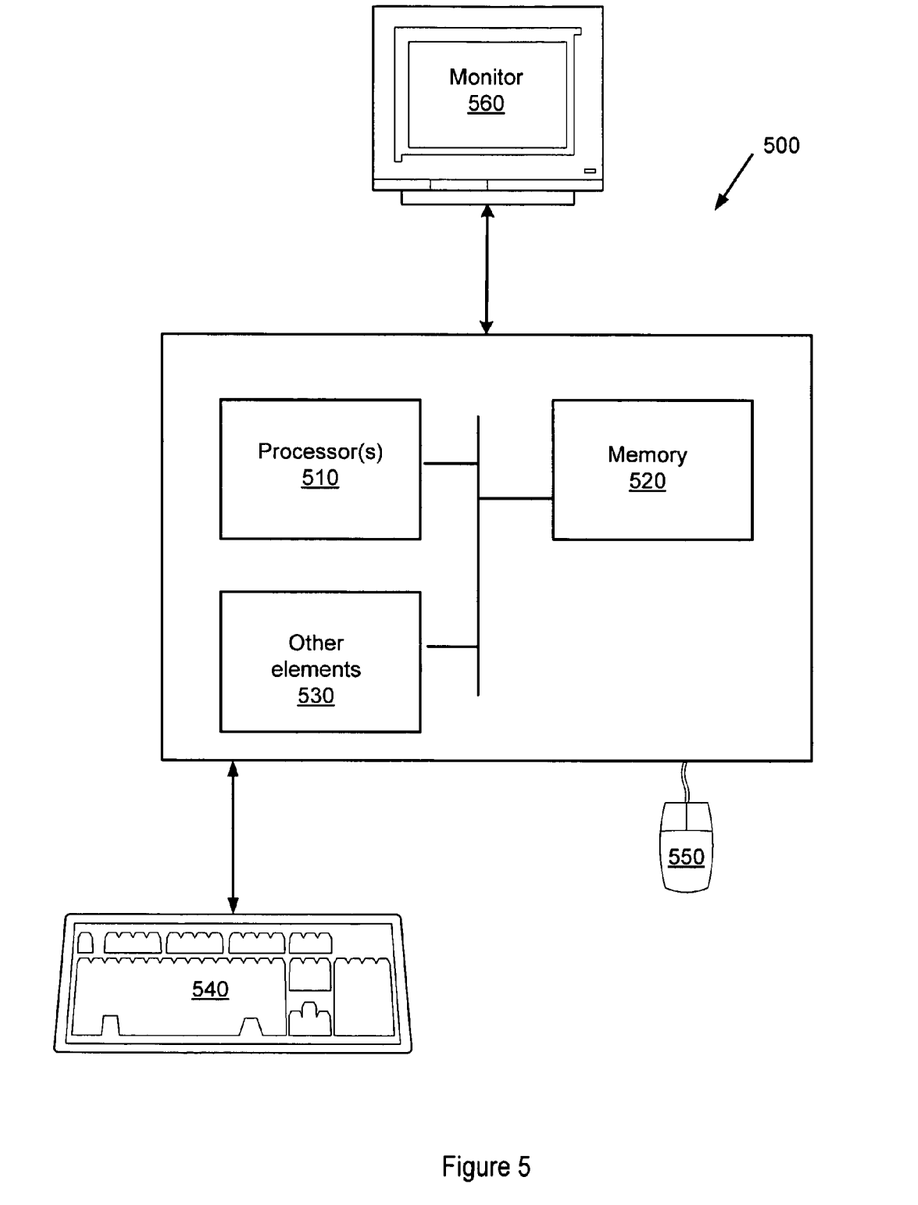
FIG. 5 shows a computer system in accordance with one or more embodiments of the invention.

One or more embodiments of the invention may be implemented on virtually any type of computer system regardless of the platform being used. For example, as shown in FIG. 5, a computer system (500) includes a processor (510), associated memory (520), and numerous other elements (530) and functionalities typical of today's computers, such as a storage device (not shown). The networked computer (500) may also include input means, such as a keyboard (540) and a mouse (550), and output means, such as a monitor (560) or other display device. One skilled in the art will appreciate that the networked computer system (500) may connect to a local area network (LAN) or a wide area network via a network interface connection (not shown). Those skilled in the art will also appreciate that these input and output means may take other forms. Further, those skilled in the art will appreciate that one or more elements of the aforementioned computer (500) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A system for correlating a video stream and an animation sequence, comprising:
 a video decoder for decoding the video stream at a first speed to extract a video frame, wherein the video frame comprises video and audio content;
 an animation renderer for rendering a plurality of animation frames at a second speed to generate the animation sequence, wherein the first speed and the second speed are not equal, and wherein the animation sequence is configured to be composited with the video stream;
 a frame correlator for correlating an animation frame of the plurality of animation frames with the video frame to obtain a correlated animation frame according to a frame index of the animation frame and a frame index of the video frame, wherein the frame index of the animation frame comprises a frame number for the animation frame, wherein the frame index of the video frame comprises a frame number for the video frame, and wherein animation content of the correlated animation frame is matched to the video and audio content of the video frame;
 an animation frame writer configured to store the correlated animation frame in an available frame buffer from a pool of frame buffers; and
 a frame compositor for compositing the video frame and the correlated animation frame to obtain a video-animation composite frame, wherein the video-animation composite frame comprises the video and audio content of the video frame in interaction with the animation content of the correlated animation frame,
 wherein the frame correlator correlates the animation frame with the video frame according to a function $i_v=f(i_a)$ to obtain a correlated animation frame, and
 wherein $i_a$ is an integer representing the frame index of the animation frame, $i_v$ is an integer representing the frame index of the video frame, and $f$ represents the function.

2. The system of claim 1, wherein the animation frame writer is further configured to store the frame index of the animation frame and the frame index of the video frame with the correlated animation frame in the available frame buffer.

3. The system of claim 1, further comprising:
 a displayer for displaying the video frame and the correlated animation frame at the same time.

4. The system of claim 1, further comprising:
 a video frame counter for counting a total number of video frames the video decoder has decoded at a given time.

5. The system of claim 1, further comprising:
 an animation frame counter for counting a total number of animation frames the animation renderer has rendered at a given time.

6. The system of claim 1, further comprising:
 an animation priority controller for controlling the second speed.

7. A method for correlating a video stream at a first speed and an animation sequence at a second speed, comprising:
 decoding the video stream to extract a video frame, wherein the video frame comprises video and audio content;
 rendering an animation frame to generate the animation sequence, wherein the first speed and the second speed are not equal, and wherein the animation sequence is configured to be composited with the video stream;
 correlating the animation frame with the video frame to obtain a correlated animation frame according to a frame index of the animation frame and a frame index of the video frame, wherein the frame index of the animation frame comprises a frame number for the animation frame from the animation sequence, wherein the frame index of the video frame comprises a frame number for the video frame from the video stream, and wherein animation content of the correlated animation frame is matched to the video and audio content of the video frame;
 storing the correlated animation frame in an available frame buffer from a pool of frame buffers; and
 compositing the video frame and the correlated animation frame to obtain a video-animation composite frame, wherein the video-animation composite frame comprises the video and audio content of the video frame in interaction with the animation content of the correlated animation frame,
 wherein correlating the animation frame with the video frame comprises using a function $i_v=f(i_a)$ to obtain a correlated animation frame, and
 wherein $i_a$ is an integer representing the frame index of the animation frame, $i_v$ is an integer representing the frame index of the video frame, and $f$ represents the function.

8. The method of claim 7, wherein the frame index of the animation frame and the frame index of the video frame are stored with the correlated animation frame in the available frame buffer.

9. The method of claim 7, further comprising:
 displaying the video frame and the correlated animation frame at the same time.

10. The method of claim 7, further comprising:
 counting a total number of video frames that have been decoded at a given time.

11. The method of claim 7, further comprising:
 counting a total number of animation frames that have been rendered at a given time.

12. A non-transitory computer readable medium comprising software instructions for correlating a video stream at a first speed and an animation sequence at a second speed, comprising software instructions to:
 decode the video stream to extract a video frame, wherein the video frame comprises video and audio content;
 render an animation frame to generate the animation sequence, wherein the first speed and the second speed are not equal, and wherein the animation sequence is configured to be composited with the video stream;
 correlate the animation frame with the video frame to obtain a correlated animation frame according to a frame index of the animation frame and a frame index of the video frame, wherein the frame index of the animation frame comprises a frame number for the animation frame from the animation sequence, wherein the frame index of the video frame comprises a frame number for the video frame from the video stream, and wherein animation content of the correlated animation frame is matched to the video and audio content of the video frame;

store the correlated animation frame in an available frame buffer from a pool of frame buffers; and composite the video frame and the correlated animation frame to obtain a video-animation composite frame, wherein the video-animation composite frame comprises the video and audio content of the video frame in interaction with the animation content of the correlated animation frame, wherein correlating the animation frame with the video frame comprises using a function $i_v = f(i_a)$ to obtain a correlated animation frame, and wherein $i_a$ is an integer representing the frame index of the animation frame, $i_v$ is an integer representing the frame index of the video frame, and $f$ represents the function.

13. The non-transitory computer readable medium of claim 12, wherein the frame index of the animation frame and the frame index of the video frame are stored with the correlated animation frame in the available frame buffer.

14. The non-transitory computer readable medium of claim 12, further comprising software instructions to:
display the video frame and the correlated animation frame at the same time.

15. The non-transitory computer readable medium of claim 12, further comprising software instructions to:
count a total number of video frames that have been decoded at a given time.

16. The non-transitory computer readable medium of claim 12, further comprising software instructions to:
count a total number of animation frames that have been rendered at a given time.

17. The system of claim 1, wherein each frame buffer of the pool of frame buffers is configured to store a single animation frame at a time.

18. The system of claim 1, wherein the frame compositor is configured to retrieve the correlated animation frame from the available frame buffer according to the frame index of the animation frame.

19. The system of claim 1, wherein the frame compositor is configured to use a compositing algorithm.

20. The method of claim 7, wherein each frame buffer of the pool of frame buffers is configured to store a single animation frame at a time.

21. The method of claim 7, further comprising:
retrieving the correlated animation frame from the available frame buffer according to the frame index of the animation frame.

22. The method of claim 7, wherein compositing the video frame and the correlated animation frame comprises using a compositing algorithm.

23. The non-transitory computer readable medium of claim 12, wherein each frame buffer of the pool of frame buffers is configured to store a single animation frame at a time.

24. The non-transitory computer readable medium of claim 12, further comprising software instructions to:
retrieve the correlated animation frame from the available frame buffer according to the frame index of the animation frame.

25. The non-transitory computer readable medium of claim 12, wherein compositing the video frame and the correlated animation frame comprises using a compositing algorithm.

* * * * *